United States Patent
Hashimoto

(10) Patent No.: US 9,181,884 B2
(45) Date of Patent: Nov. 10, 2015

(54) CONTROL APPARATUS FOR VEHICLE

(75) Inventor: Masayuki Hashimoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 819 days.

(21) Appl. No.: 13/515,350

(22) PCT Filed: Dec. 9, 2010

(86) PCT No.: PCT/IB2010/003164
§ 371 (c)(1),
(2), (4) Date: Jun. 12, 2012

(87) PCT Pub. No.: WO2011/073755
PCT Pub. Date: Jun. 23, 2011

(65) Prior Publication Data
US 2012/0253645 A1 Oct. 4, 2012

(30) Foreign Application Priority Data
Dec. 14, 2009 (JP) ................. 2009-282821

(51) Int. Cl.
G06F 17/00 (2006.01)
F02D 41/00 (2006.01)
(Continued)

(52) U.S. Cl.
CPC .......... *F02D 41/0005* (2013.01); *F02D 41/068* (2013.01); *F02D 41/083* (2013.01); *F02D 41/086* (2013.01); *F02D 41/123* (2013.01);
(Continued)

(58) Field of Classification Search
CPC . F02D 41/0005; F02D 41/068; F02D 41/086; F02D 41/123; F02D 41/126; Y02T 10/42

USPC .......... 701/104, 112; 123/198 DB, 325, 332, 123/481
See application file for complete search history.

(56) References Cited

U.S. PATENT DOCUMENTS 4,434,769 A    3/1984   Otobe et al.
4,862,367 A *   8/1989   Tada et al. ........................ 701/93
(Continued)

FOREIGN PATENT DOCUMENTS

JP    59-208132 A    11/1984
JP    60-256533 A    12/1985
(Continued)

OTHER PUBLICATIONS

International Search Report and Written Opinion for corresponding International Patent Application No. PCT/IB2010/003164 mailed Apr. 27, 2011.

*Primary Examiner* — Mahmoud Gimie
*Assistant Examiner* — David Hamaoui
(74) *Attorney, Agent, or Firm* — Sughrue Mion, PLLC

(57) ABSTRACT

An engine control device, while executing a fuel-cut control, calculates a target intake air amount (Qat) from a basic intake air amount (Qabase) and an added intake air amount (Qaadd) commensurate with an accessory torque (step S14). Next, the engine control device acquires a coolant temperature (Tw) (step S15), and then sets a lower-limit intake air amount (Qamin) (step S16). When the target intake air amount (Qat) is smaller than the lower-limit intake air amount (Qamin) (NO in step S17), the engine control device updates the target intake air amount (Qat) with the lower-limit intake air amount (Qamin). (step S18), and adjusts the degree of throttle opening so that the actual intake air amount (Qa) becomes equal to the target intake air amount (Qat) (step S19).

8 Claims, 4 Drawing Sheets

(51) Int. Cl.
  *F02D 41/06* (2006.01)
  *F02D 41/08* (2006.01)
  *F02D 41/12* (2006.01)
  *F02D 31/00* (2006.01)

(52) U.S. Cl.
  CPC ............. *F02D 31/003* (2013.01); *F02D 41/126* (2013.01); *F02D 2200/021* (2013.01); *F02D 2250/22* (2013.01); *Y02T 10/42* (2013.01)

(56) References Cited

U.S. PATENT DOCUMENTS

| | | | |
|---|---|---|---|
| 5,157,956 A * | 10/1992 | Isaji et al. | 73/1.75 |
| 5,542,393 A * | 8/1996 | Katoh et al. | 123/491 |
| 5,979,413 A * | 11/1999 | Ohnuma et al. | 123/491 |
| 6,155,954 A * | 12/2000 | Itoyama et al. | 477/5 |
| 6,389,807 B1 | 5/2002 | Suzuki et al. | |
| 6,550,319 B1 * | 4/2003 | Rutkowski et al. | 73/114.32 |
| 7,275,518 B1 * | 10/2007 | Gartner et al. | 123/406.23 |
| 7,395,808 B2 * | 7/2008 | Yoshioka | 123/325 |
| 7,398,148 B2 * | 7/2008 | Yoshioka et al. | 701/103 |
| 7,757,665 B2 * | 7/2010 | Tamai et al. | 123/481 |
| 2008/0202482 A1 | 8/2008 | Furuta et al. | |

FOREIGN PATENT DOCUMENTS

| | | | | |
|---|---|---|---|---|
| JP | 10-252532 A | 9/1998 | | |
| JP | 11-062664 A | 3/1999 | | |
| JP | 2001-164970 A | 6/2001 | | |
| JP | 2003-120376 A | 4/2003 | | |
| JP | 2004162532 A * | 6/2004 | | F02D 41/12 |
| JP | 2007-113507 A | 5/2007 | | |
| JP | 2008-208781 A | 9/2008 | | |

* cited by examiner

CONTROL APPARATUS FOR VEHICLE

INCORPORATION BY REFERENCE

The disclosure of Japanese Patent Application No. 2009-282821 filed on Dec. 14, 2009, including the specification, drawings and abstract is incorporated herein by reference in its entirety.

BACKGROUND OF THE INVENTION

1. Field of the Invention

The invention relates to a control apparatus for a vehicle which is capable of stopping the supply of fuel to an internal combustion engine during deceleration.

2. Description of the Related Art

Generally, a vehicle equipped with an internal combustion engine is designed to perform a fuel-cut process of stopping the supply of fuel to the internal combustion engine so as to improve fuel economy.

Such a vehicle is designed so that after an accelerator pedal of the vehicle is released and the vehicle begins to decelerate, the fuel-cut control of stopping the supply of fuel to the internal combustion engine is executed until the engine rotation speed of the internal combustion engine drops to a predetermined value. Then, after the engine rotation speed drops to the predetermined value, the vehicle ends the execution of the fuel-cut and starts supplying fuel again in order to prevent occurrence of engine stall.

Among vehicle control apparatuses that execute the fuel-cut control, there is known a control apparatus that switches between the execution and the non-execution of the fuel-cut according to the temperature of a catalyst that is disposed in an exhaust passageway of the internal combustion engine, so as to prevent degradation of the catalyst (see, e.g., Japanese Patent Application Publication No. 11-62664 (JP-A-11-62664)).

The vehicle control apparatus described in Japanese Patent Application Publication No 11-62664 (JP-A-11-62664) is designed to execute the fuel-cut control when the degree of throttle opening is a fully closed degree and the rotation speed of the internal combustion engine is greater than or equal to a predetermined value.

It is to be noted herein that if a fuel-lean exhaust gas passes through the catalyst in a high temperature state, the excess supply of oxygen accelerates the growth of particles of platinum (Pt) in the catalyst. Therefore, the total surface area of Pt that contacts exhaust gas in the catalyst reduces, so that the exhaust gas control performance declines.

Therefore, the vehicle control apparatus described in Japanese Patent Application Publication No. 11-62664 (JP-A-11-62664) determines whether or not the catalyst is in a high temperature state during execution of the fuel-cut control. When it is determined that the catalyst is in the high temperature state, the control apparatus prohibits execution of the fuel-cut control even if the condition for executing the fuel-cut control is satisfied. In this manner, the control apparatus prevents the catalyst from being exposed to lean exhaust gas and therefore prevents reduction of the surface area of Pt in the catalyst, and thus maintains the exhaust emission control performance.

On another hand, if the fuel-cut control is prohibited during the high temperature state of the catalyst as described above while the internal combustion engine is warming up, misfire may occur due to unstable combustion resulting from high viscosity of the lubricating oil of the engine or low atomization of fuel. If unburnt fuel is supplied together with exhaust gas into the catalyst, and ignites therein, the catalyst performance is rather likely to degrade. Therefore, the vehicle control apparatus described in Japanese Patent Application Publication No. 11-62664 (JP-A-11-62664) discontinues the prohibition of the fuel-cut control during the warming-up of the internal combustion engine, even if the catalyst is in the high temperature state.

Beside, generally in conjunction with the vehicle control apparatuses that execute the fuel-cut control as described above, since combustion is unstable during the warming-up state of the internal combustion engine (during a state in which the engine is being warmed up), the likelihood of occurrence of engine stall heightens if the fuel-cut control is ended while the engine rotation speed has become low. Therefore, during the warming-up state, the engine rotation speed at which to end the fuel-cut control is set higher than after the end of the warming-up, so as to prevent occurrence of engine stall.

Therefore, when the engine is being warmed up, the continuation time of the fuel-cut becomes shorter and therefore improvement of the fuel economy is hampered, in comparison with when the engine has been warmed up. Therefore, in order to realize improved fuel economy, it is advisable to delay the end of the fuel-cut control as much as possible by adopting a construction in which the engine rotation speed at which to end the fuel-cut control during the warming-up of the engine is set lower than in the related art.

However, the related-art vehicle control apparatus described in Japanese Patent Application Publication No. 11-62664 (JP-A-11-62664) is not designed so that the engine rotation speed at which to end the fuel-cut control during the warming-up of the engine is set lower than in the related art. Therefore, if the fuel-cut control during the warming-up of the engine is executed at lower engine rotation speeds than in the related art, it is likely that when the supply of fuel is started again, the combustion will be unstable and the engine rotation speed will not rise, and therefore a drawback, such as engine stall or the like, will occur.

SUMMARY OF THE INVENTION

In view of the foregoing problems of the related art, the invention provides a control apparatus for a vehicle which is capable of improving fuel economy without causing engine stall in conjunction with the execution of the fuel-cut control during the warming-up of the engine, and capable of preventing deterioration of driveability at the end of the fuel-cut control.

To that end, according to one aspect of the invention, there is provided a vehicle control apparatus which is installed in a vehicle that includes an intake gas flow adjustment mechanism that is disposed on an intake passageway of an internal combustion engine and that adjusts an intake air amount that is taken into the internal combustion engine, and which adjusts the intake air amount by controlling the intake gas flow adjustment mechanism, and which includes: a coolant temperature detector that detects coolant temperature of the internal combustion engine; a fuel supply stop device that stops supply of fuel to the internal combustion engine on a condition that the engine rotation speed of the internal combustion engine is greater than or equal to a predetermined value during deceleration of the vehicle; an intake air amount-setting device that sets the intake air amount based on a running condition of the vehicle; a control device that controls the intake gas flow adjustment mechanism so as to realize the intake air amount that is set by the intake air amount-setting device; and a lower limit value-setting device that sets a lower limit value of the intake air amount according to the coolant temperature detected by the coolant temperature detector, wherein the lower limit value-setting device sets the lower limit value of the intake air amount higher when the coolant temperature detected by the coolant temperature detector is relatively low than when the coolant temperature is relatively high, and the control device controls the intake gas flow adjustment mechanism so that the intake air amount taken into the internal combustion engine becomes equal to the lower limit value, when the intake air amount set by the intake air amount-setting device is less than the lower limit value set by the lower limit value-setting device while the supply of fuel has been stopped by the fuel supply stop device.

According to another aspect of the invention, there is provided a control method which is for a vehicle that includes an intake gas flow adjustment mechanism that is disposed on an intake passageway of an internal combustion engine and that adjusts an intake air amount that is taken into the internal combustion engine, and which adjusts the intake air amount by controlling the intake gas flow adjustment mechanism.

detecting coolant temperature of the internal combustion engine;
stopping supply of fuel to the internal combustion engine on a condition that engine rotation speed of the internal combustion engine is greater than or equal to a predetermined value during deceleration of the vehicle;
setting the intake air amount based on a running condition of the vehicle; and
controlling, the intake gas flow adjustment mechanism so as to realize the intake air amount set,
wherein a lower limit value of the intake air amount is set according to the coolant temperature detected, and the lower limit value of the intake air amount is set higher when the coolant temperature is relatively low than when the coolant temperature is relatively high, and the intake gas flow adjustment mechanism is controlled so that the intake air amount taken into the internal combustion engine becomes equal to the lower limit value, when the intake air amount is less than the set lower limit value while the supply of fuel has been stopped.

According to the foregoing vehicle control apparatus and the vehicle control method, the intake air amount taken into the internal combustion engine can be increased when the supply of fuel is stopped during the warming-up of the engine, during which the coolant temperature is low. Therefore, during the warming-up of the engine, during which there is high possibility of misfire being caused by relatively low atomization of fuel or relatively high viscosity of lubricating oil, fuel can be certainly burned when the supply of fuel is started again. Therefore, although the engine rotation speed at which to end the fuel-cut control during the warming-up of the engine is set lower than in the related art, the engine rotation speed can be certainly made high at the end of the fuel-cut control. Hence, it is possible to re-start the supply of fuel later than in the related art without causing engine stall. As a result, fuel economy can be improved.

In the vehicle control apparatus, the lower limit value-setting device may set another lower limit value for causing absolute value of negative pressure in a combustion chamber of the internal combustion engine to be less than or equal to a predetermined value when the supply of fuel has been stopped by the fuel supply stop device, and may set the another lower limit value as a new lower limit value when the coolant temperature is in a range of the coolant temperature in which the another lower limit value is higher than the lower limit value that is set according to the coolant temperature.

Besides, in the foregoing vehicle control method, another lower limit value for causing absolute value of negative pressure in a combustion chamber of the internal combustion engine to be less than or equal to a predetermined value when the supply of fuel has been stopped may be set, and the another lower limit value may be set as a new lower limit value when the coolant temperature is in a range of the coolant temperature in which the another lower limit value is higher than the lower limit value that is set according to the coolant temperature.

According to the foregoing vehicle control apparatus and the foregoing control method, it is possible not only to prevent engine stall during the warming-up of the engine but also to prevent the oil that lubricates the internal combustion engine from entering the combustion chamber and being consumed therein due to the negative pressure of the internal combustion engine.

Besides, in the foregoing vehicle control apparatus, the intake gas flow adjustment mechanism may be constructed of a throttle valve, and the control device may control degree of opening of the throttle valve.

According to the foregoing vehicle control apparatus, the intake air amount can be adjusted without complicating the construction of the intake gas flow adjustment mechanism. Besides, even though the lower limit value of the intake air amount is set high, sufficient intake air amount can be secured by increasing the degree of throttle opening.

Besides, in the foregoing vehicle control apparatus, the intake gas flow adjustment mechanism may have a throttle valve, and an idle speed control valve that i actuated during an idling state of the internal combustion engine, and the control device may control degree of opening of the throttle valve and degree of opening of the idle speed control valve.

According to the foregoing vehicle control apparatus, even though the lower limit value of the intake air amount is set high, sufficient intake air amount can be secured by increasing the degree of throttle opening.

According to the invention, it is possible to provide a control apparatus for a vehicle which is able to improve fuel economy by preventing engine stall when executing the fuel-cut control during the warming-up of the engine, and is able to prevent deterioration of driveability at the end of the fuel-cut control.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, a control apparatus for a vehicle 1 in accordance with an embodiment of the invention will be described with reference to FIGS. 1 to 4. Firstly, a construction will be described.

Figure 1:
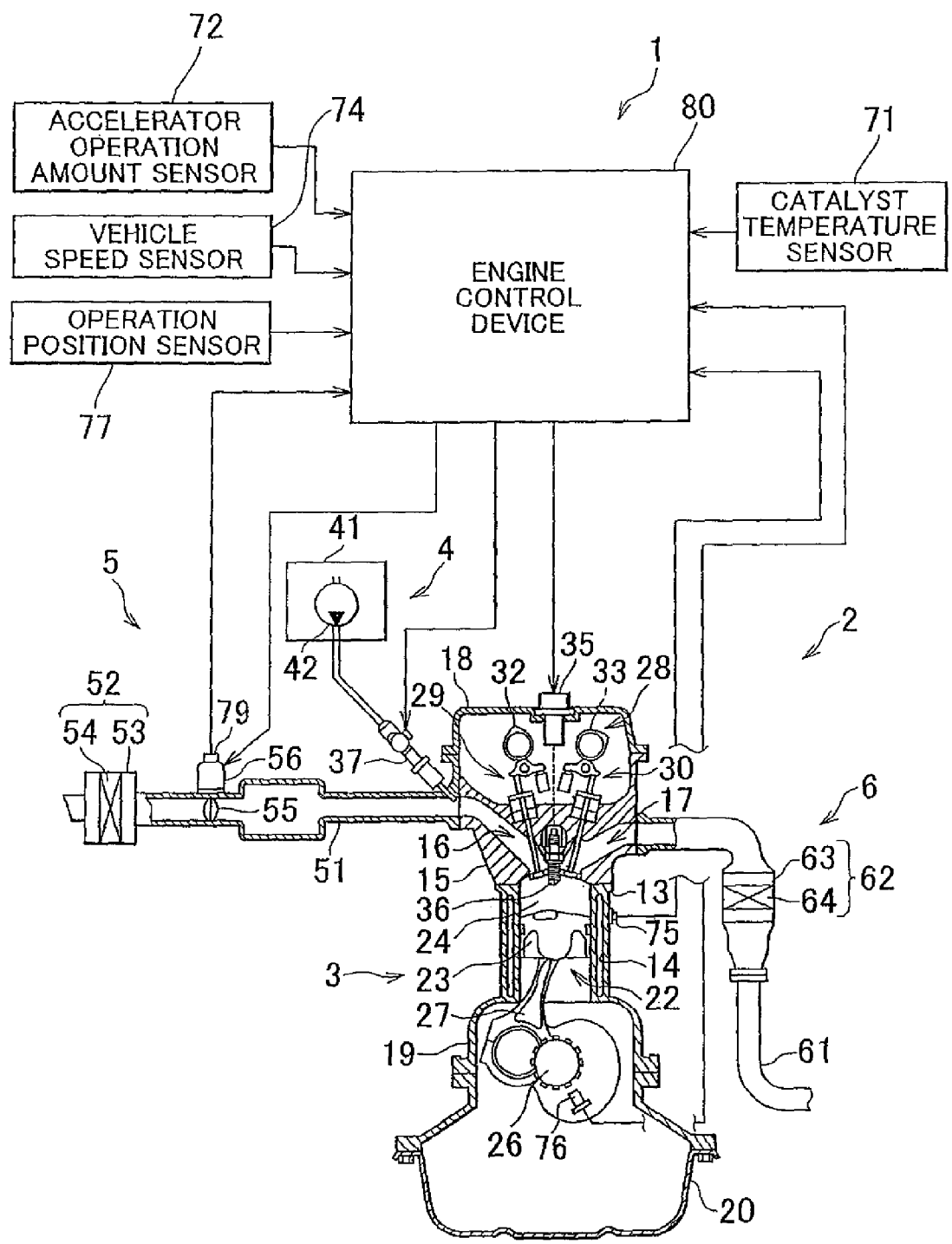
FIG. 1 is a general construction diagram showing a construction of an engine and its surroundings in accordance with an embodiment of the invention.

As shown in FIG. 1, an engine 2 that is an internal combustion engine mounted in the vehicle 1 is a four-stroke cycle gasoline engine that undergoes a series of four strokes, that is, the intake stroke, the compression stroke, the expansion stroke and the exhaust stroke, during two back-and-force movements of a piston 2 (described later). Incidentally, although this embodiment is described on the assumption that the engine 2 is an in-line four-cylinder gasoline engine, the engine according to the invention is not limited so, but may also be any of other various kinds of engines, for example, an in-line six-cylinder engine, a V-type six-cylinder engine, a V-type twelve-cylinder engine, a flat six-cylinder engine, etc.

The engine 2 has an engine body section 3, a fuel supply section 4, an intake section 5, and an exhaust section 6. The following description will be made mainly in conjunction with one of the four cylinders 22 arranged in line, as an example.

The engine body section 3 has: a cylinder block 13 that is fixed to a vehicle body via an engine mount (not shown); a cylinder head 15 fixed to a side of the cylinder block 13; a head cover 18 fixed to the cylinder head 15; a crank case 19 fixed to another side of the cylinder block 13; and an oil pan 20 that is fixed to the crank case 19 and that is constructed so as to be capable of storing lubricating oil.

A water jacket 14 in which a coolant is caused to flow is formed in the cylinder block 13, so that the water jacket 14 cools the cylinder block 13 through heat exchange with the coolant.

Intake ports 16 and exhaust ports 17 are formed in the cylinder head 15. Besides, the cylinder block 13 and the cylinder head 15 define a cylinder (actually, four cylinders) 22.

Besides, the engine body section 3 has a cylindrical piston 23 that is housed in the cylinder block 13 so as to be slidable in an axis direction of the cylinder 22. The cylinder block 13, the cylinder head 15 and the piston 23 together define a pent roof type combustion chamber 24.

A plurality of piston ring grooves are formed in a side peripheral surface portion of the piston 23. Piston rings that contact an inner peripheral surface of the cylinder block 13 are fitted into the individual piston ring grooves. Since the piston 23 slides with the piston rings in contact with the inner peripheral surface of the cylinder block 13, the piston 23 slides within the cylinder 22 in the axis direction thereof while the combustion chamber 24 is kept substantially airtight.

Besides, the engine body section 3 has a crankshaft 26 that is housed in the crankcase 19 and that constitutes an output shaft of the engine 2, and a connecting rod 27 that links the piston 23 and the crankshaft 26. The engine body section 3 is constructed so that reciprocating motion of the piston 23 is converted into rotary motion of the crankshaft 26 via the connecting rod 27.

The crankshaft 26 has: crank journals that are rotatably supported by the crankcase 19; a plurality of crank arms that are protruded radially from the crank journals; crank pins formed between predetermined ones of the crank arms so as to be parallel to the crank journals with predetermined interaxial distances; and counter weights that are provided at radially opposite sides to the crank pins and that are formed integrally with crank arms, respectively.

The connecting rod 27 has a rod body that is formed in a bar shape. The rod body has a small end portion in which a small bearing hole is formed, and, at the opposite side of the rod body to the small end portion, a large end portion in which a large bearing hole is formed. The small end portion is constructed so that a piston pin attached to the piston 23 is rotatably inserted into the small bearing hole and therefore the small end portion links the piston 23 and the connecting rod 27 via the piston pin. The large end portion of the connecting rod 27 is constructed so as to link the connecting rod 27 and the crankshaft 26 with the crank pin inserted into the large bearing hole.

Furthermore, the engine body section 3 has a valve-operating mechanism 28 that is fixed to the cylinder head 15, an ignition device 35 that is fixed to the head cover 18, and an injector 37 that is disposed near the cylinder head 15.

The valve-operating mechanism 28 is constructed of a variable valve mechanism (e.g., VVT-i, or Variable Valve Timing-intelligent system) that optimally controls the open/close timing of each of intake valves 29 and exhaust valves 30 according to the running condition of the vehicle 1. Besides, the valve-operating mechanism 28 has the intake valves 29 and the exhaust valves 30 of a rocker arm type, and an intake camshaft 32 and an exhaust camshaft 33 that are rotatably supported. The valve-operating mechanism 28 converts rotation of the intake camshaft 32 and the exhaust camshaft 33 into reciprocating motion of the intake valves 29 and the exhaust valves 30 via the rocker arms. Therefore, the valve-operating mechanism 28 switches the state of communication of the intake ports 16 and the exhaust ports 17 with the combustion chamber 24 at optimum open/close timing according to the running condition of the vehicle 1, by moving the intake valves 29 and the exhaust valves 30 back and forth.

The intake camshaft 32 and the exhaust camshaft 33 are each supported rotatably by a camshaft housing (not shown) that is fixed to the cylinder head 15, and are constructed so as to rotate in interlock with the crankshaft 26 via a timing chain (not shown). Besides, the intake camshaft 32 and the exhaust camshaft 33 have cams that contact rocker arms that each correspond to one of the intake valves 29 and the exhaust valves 30, and therefore push down each rocker arm at every predetermined rotation angle of a corresponding one of the cams.

The piston 23, the crankshaft 26, the connecting rod 27 and the valve-operating mechanism 28, which are described above, are constructed so as to be lubricated and cooled by oil that is pumped from the oil pan 20 and is circulated by a torochoid type oil pump.

The ignition device 35 has a spark plug 36 which is formed of a center electrode and a ground electrode and a portion of which is protruded into the combustion chamber 24. The electric current supplied to an ignition coil of the ignition device 35 is controlled by an engine control device 80 so that the ignition device 35 ignites a mixture of fuel and air at optimum timing.

The injector 37 is constructed of a port ignition type fuel injection device, and has a fuel injection portion in which a small fuel injection hole is formed and a portion of which is exposed to an interior of the intake port 16, and a drive portion that switches the open/closed state of the fuel injection hole by using an electromagnetic valve that is controlled by the engine control device 80. The injector 37 is supplied with fuel that is pressurized to a predetermined pressure by a fuel pump 42 described below. Besides, when the electromagnetic valve is electrified, the injector 37 opens its fuel injection hole and injects the pressurized fuel in an atomized state into the intake port 16. On the other hand, when the electromagnetic valve de-electrified, the injector 37 closes the fuel injection hole and therefore refrains from injecting fuel.

the injector 37 is not limited to the port ignition type, but may also be constructed by an in-cylinder injection type fuel injection device that injects fuel directly into the combustion chamber 24, and may also employ a combination of a port ignition type fuel injection device and an in-cylinder injection fuel injection device.

The fuel supply section 4 has an iron or resin-made fuel tank 41 whose interior has been treated with a rust prevention process, and a circumferential flow-type fuel pump 42 that is housed in the fuel tank 41. The fuel supply section 4 is designed so as to supply fuel that has been pressurized to a predetermined pressure by the fuel pump 42, to the injector 37 via a fuel delivery pipe. Incidentally, in the case where the foregoing in-cylinder injection type fuel injection device is used, the fuel supply section 4 may further has a high-pressure fuel pump that supplies high-pressure fuel to the in-cylinder injection type fuel injection device, as well as the fuel pump 42.

The intake section 5 has: an intake pipe 51 that is connected at a side end thereof to the cylinder head 15; an air filter 52 connected to a second end side of the intake pipe 51; a single-valve type throttle valve 55 provided in the intake path between the cylinder head 15 and the air filter 52; and a throttle actuator 56 that is constructed of an electronically controlled motor that is controlled by the engine control device 80. The intake section 5 is constructed so as to introduce air into the engine body section 3. Incidentally, the intake pipe 51 in accordance with this embodiment constitutes an example of an intake passageway in accordance with the invention.

The air filter 52 has a filter case 53 that is connected to the second end side of the intake pipe 51, and a filter element 54 that is housed in the filter case 53 and that is made of a non-woven fabric. The air filter 52 is designed so as to remove dust and the like from the air that is introduced into the intake section 5 from outside the vehicle.

The throttle valve 55 has a disc shaped valve body, and a valve shaft that is fixed to the valve body. The throttle valve 55 is designed so that the valve body is pivoted by pivoting the valve shaft via the throttle actuator 56, whereby the channel cross-sectional area of air in the intake pipe 51 is changed. Due to this, the throttle valve 55 adjusts the amount of flow of air that is introduced into the engine body section 3.

Incidentally, the throttle valve 55 in accordance with this embodiment constitutes an example of an intake gas flow adjustment mechanism in accordance with the invention.

The exhaust section 6 has an exhaust pipe 61 that is connected at an end side thereof to the cylinder head 15, and a catalytic converter 62. The exhaust section 6 is constructed so as to discharge exhaust gas produced in the engine body portion 3, to the outside of the vehicle.

The catalytic converter 62 has a converter case 63 that is connected to the exhaust pipe 61, and a catalyst 64 that is housed in the converter case 63. The catalyst 64 is constructed of a three-way catalyst in which an alumina support is loaded with an oxidation-reduction catalyst, such as platinum, rhodium, palladium, etc. The catalyst 64 substantially purifies the exhaust gas produced by combustion of air-fuel mixture by efficiently removing harmful substances, such as unburnt hydrocarbon (HC), carbon monoxide (CO), nitrogen oxides (NOx), etc., which are contained in exhaust gas.

The catalyst temperature sensor 71 is disposed near the catalytic converter 62, and detects the temperature of the catalyst 64, and outputs the temperature to the engine control device 80.

The vehicle 1 further includes the engine control device 80 that constitutes a control apparatus for a vehicle in accordance with the invention. The engine control device 80 is constructed of a known ECU (Electronic Control Unit), and controls the magnitude of torque output from the engine 2, and also executes other various controls described below.

Incidentally, the engine control device 80 in accordance with the embodiment constitutes an example of a coolant temperature detector, a fuel supply stop device, an intake air amount-setting device, a control device, and a lower limit value-setting device in accordance with the invention.

Figure 2:
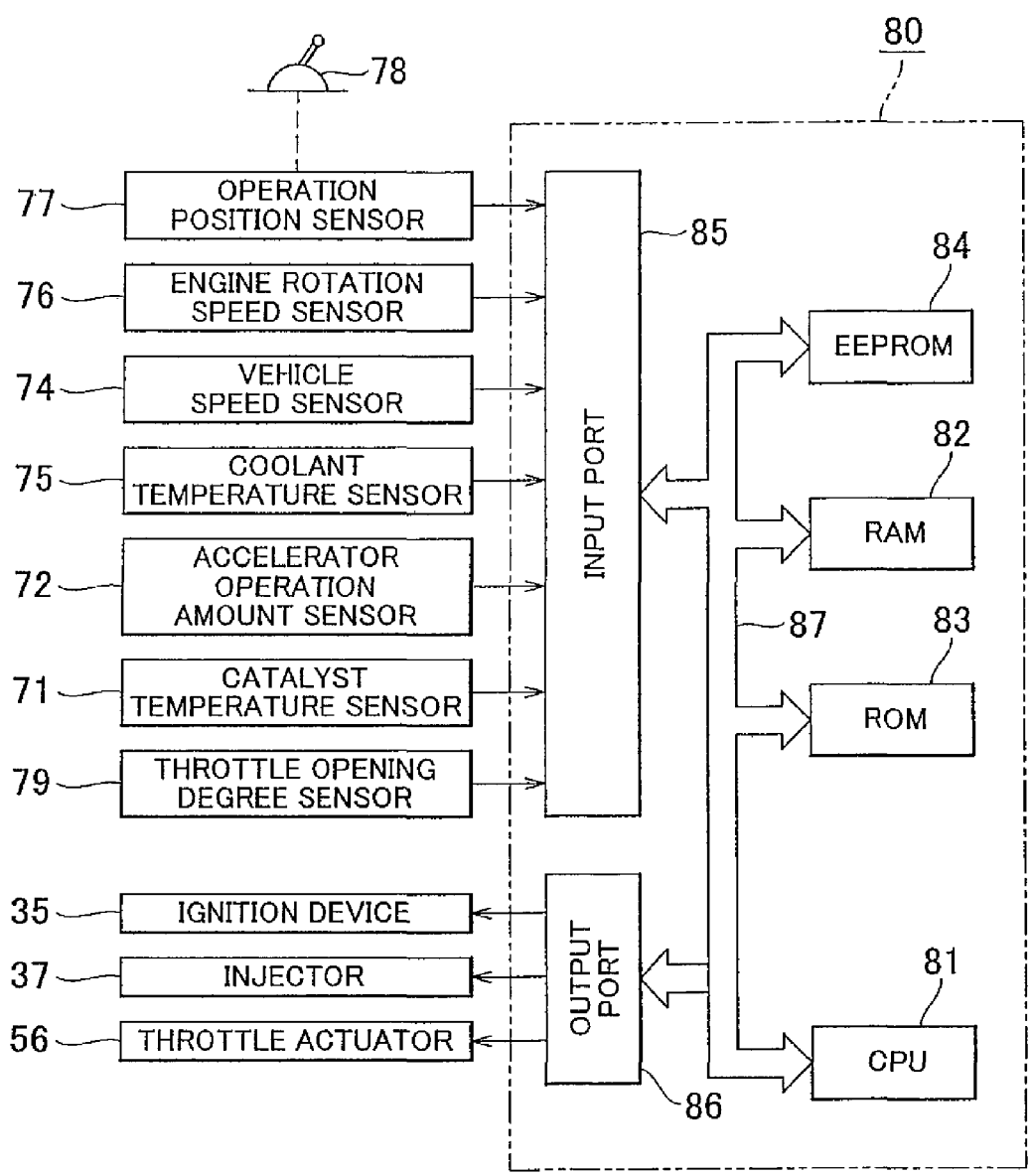
FIG. 2 is a general construction diagram showing a control apparatus for a vehicle in accordance with an embodiment of the invention.

A coolant temperature sensor 75 shown in FIG. 2 is constructed of, for example, a thermistor whose electric resistance changes according to temperature. Therefore, the coolant temperature sensor 75 is designed so that the resistance of the thermistor changes according to the coolant temperature Tw of the engine 2, and so that therefore voltage that changes according to the coolant temperature Tw is output as a signal that represents the coolant temperature Tw to the engine control device 80. The engine control device 80 detects the coolant temperature Tw on the basis of the magnitude of the voltage obtained from the coolant temperature sensor 75. Therefore, the coolant temperature sensor 75 and the engine control device 80 constitute an example of a coolant temperature detector in accordance with the invention. The coolant temperature sensor 75 is attached to an external wall surface of the cylinder block 13 so as to detect the temperature of the coolant that flows in the water jacket 14.

As shown in FIG. 2, the engine control device 80 is constructed of a microcomputer that includes a CPU (Central Processing Unit) 81, a RAM (Random Access Memory) 82, a ROM (Read-Only Memory) 83, an EEPROM (Electrically Erasable and Programmable Read-Only Memory, registered trademark) 82, an input port 85, an output port 86, etc., which are interconnected by a bidirectional bus 87. The CPU 81 executes an output control of the engine 2 and the like by performing the signal processing in accordance with programs and maps stored beforehand in the ROM 83 and data stored in the EEPROM 84, while utilizing the temporary storage function of the RAM 82. The signals output from the output port 86 are sent to the throttle actuator 56 and the like via an A/D converter.

Besides, the engine control device 80 controls the degree of opening of the throttle valve 55, the amount of fuel injection and the timing of fuel injection of the injector 37, the ignition timing of the spark plug 36, on the basis of the signals input from various sensors.

The vehicle 1 further includes an accelerator operation amount sensor 72, a vehicle speed sensor 74, an engine rotation speed sensor 76, an operation position sensor 77 for detecting the operation position of a shift lever 78, a throttle opening degree sensor 79, and the like.

The accelerator operation amount sensor 72 is constructed of, for example, an electronic position sensor that uses a Hall element. When the accelerator pedal is operated by a driver, the accelerator operation amount sensor 72 outputs to the engine control device 80 a signal that represents an accelerator operation amount Ace that shows the position of the accelerator pedal. The engine control device 80 controls the degree of opening of the throttle valve 55 (see FIG. 1), the fuel injection timing of the injector 37, and the ignition timing of the spark plug 36 (see FIG. 1), so as to cause the engine 2 to generate a torque commensurate with the accelerator operation amount Acc.

The vehicle speed sensor 74 outputs to the engine control device 80 a signal that represents rotation speed Nout of the output shaft. On the basis of this signal, the engine control device 80 calculates vehicle speed V.

The engine rotation speed sensor 76, constituting a device that detects the engine rotation speed of the engine 2, detects the engine rotation speed Ne of the engine 2 on the basis of the rotation of the crankshaft 26.

The operation position sensor 77 detects the position of the shift lever 78, and sends a signal that represents a result of detection to the engine control device 80. On the basis of the signal input from the operation position sensor 77, the engine control device 80 determines the position of the shift lever 78. Besides, the vehicle 1 includes a transmission control device that controls the transmission ratio of the automatic transmission according to the vehicle speed V and the accelerator operation amount Acc. The engine control device 80 acquires a signal that represents the present transmission ratio from the transmission control device that is connected to the engine control device 80 via an in-vehicle LAN line.

The throttle opening degree, sensor 79 is constructed of, for example, a Hall element that provides an output voltage commensurate with the degree of throttle opening of the throttle valve 55 (see FIG. 1). The throttle opening degree sensor 79 outputs to the engine control device 80 a signal that represents the degree of throttle opening of the throttle valve 55.

A characteristic construction of the engine control device 80 in accordance with the embodiment of the invention will be described with reference to FIG. 1 to FIG. 3. When the vehicle 1 is decelerating, the engine control device 80 executes a fuel-cut control. Concretely, the engine control device 80 starts the fuel-cut control provided that the signal input from the accelerator operation amount sensor 72 is a signal that represents the closed state of the accelerator operation amount, and that the signal that is input from the engine rotation speed sensor 76 and that represents the engine rotation speed Ne is within a predetermined range in which the fuel-cut can be executed, and that the present transmission ratio input from the transmission control device is a transmission ratio that allows execution of the fuel-cut.

Thus, the engine control device 80 in accordance with this embodiment constitutes an example of a fuel supply stop device in accordance with the invention.

On the basis of the signal input from the engine rotation speed sensor 76, the engine control device 80 ends the fuel-cut control when the engine rotation speed Ne of the engine 2 becomes lower than a predetermined value. Incidentally, with regard to the engine control device 80 in accordance with this embodiment, the engine rotation speed Ne at which to end the fuel-cut control is set lower than the engine rotation speed Ne at which to end the fuel-cut control in the related art because of execution of an intake air amount control that is described in detail below, so that the fuel-cut control ends later than in the related art. Besides, the engine rotation speed Ne at which to end the fuel-cut control is determined beforehand at a value at which engine stall does not occur, through empirical measurement.

In the case where the vehicle 1 is equipped with a torque converter that includes a lockup mechanism, the lockup mechanism is set into an engaged state or a slipping engagement state along with execution of the fuel-cut control, so as to delay the decline of the engine rotation speed Ne of the engine 2. In this case, the transmission control device switches the lockup mechanism between the engaged state and the slipping state according to the present transmission ratio.

Besides, the engine control device 80 calculates a basic intake air amount Qabase that represents a basic value of the amount of intake air that is taken into the combustion chamber 24 during the fuel-cut control. Concretely, the engine control device 80, after acquiring from the engine rotation speed sensor 76 a signal that represents the engine rotation speed Ne, calculates the basic intake air amount Qabase with reference to a basic intake air amount map in which the engine rotation speed Ne and the basic intake air amount Qabase are associated with each other in correspondence. The basic intake air amount map is defined so that the greater the engine rotation speed Ne, the greater the basic intake air amount Qabase.

Besides, the engine control device 80 calculates an added intake air amount Qaadd that is needed according to an accessory torque. Concretely, the ROM 83 of the engine control device 80 pre-stores an airconditioner torque map in which the duty ratio of a compressor of an airconditioner and the rotation speed are associated in correspondence with the torque of an airconditioner pulley. After acquiring the duty ratio of the compressor and the rotation speed of the airconditioner pulley, the engine control device 80 calculates a torque that is needed in order to drive the airconditioner with reference to the airconditioner torque map.

Besides, the engine control device 80 calculates an accessory torque that is needed in order to drive a coolant pump. The coolant pump is provided at an inlet opening side of a coolant circuit that includes the water jacket 14 and that is formed in the cylinder block 13. The engine control device 80 pre-stores in the ROM 83 the torque that is generated according to the state of driving of the coolant pump as a coolant pump torque map. With reference to the coolant pump torque map, the engine control device 80 calculates the torque that is needed in order to drive the coolant pump.

Besides, the engine control device 80 pre-stores in the ROM 83 the torque that is generated according to the driving state of the alternator. With reference to the alternator torque map, the engine control device 80 calculates the torque that is needed in order to drive the alternator.

The engine control device 80 pre-stores in the ROM 83 the added intake air amount map in which the accessory torque and the added intake air amount Qaadd are associated in correspondence. After totaling the accessory torques that are needed in order to drive the foregoing accessories, the engine control device 80 acquires an added intake air amount Qaadd with reference to the added intake air amount map stored in the ROM 83.

Besides, the engine control device 80 calculates a target intake air amount Qat by summing the basic intake air amount Qabase and the added intake air amount Qaadd. Therefore, the engine control device 80 in accordance with this embodiment constitutes an example of an intake air amount-setting device that sets an intake air amount on the basis of the running condition of the vehicle 1.

Besides, the engine control device 80 sets a lower-limit intake air amount Qamin on the basis of an intake air amount lower-limit-value map that will be described below.

Figure 3:
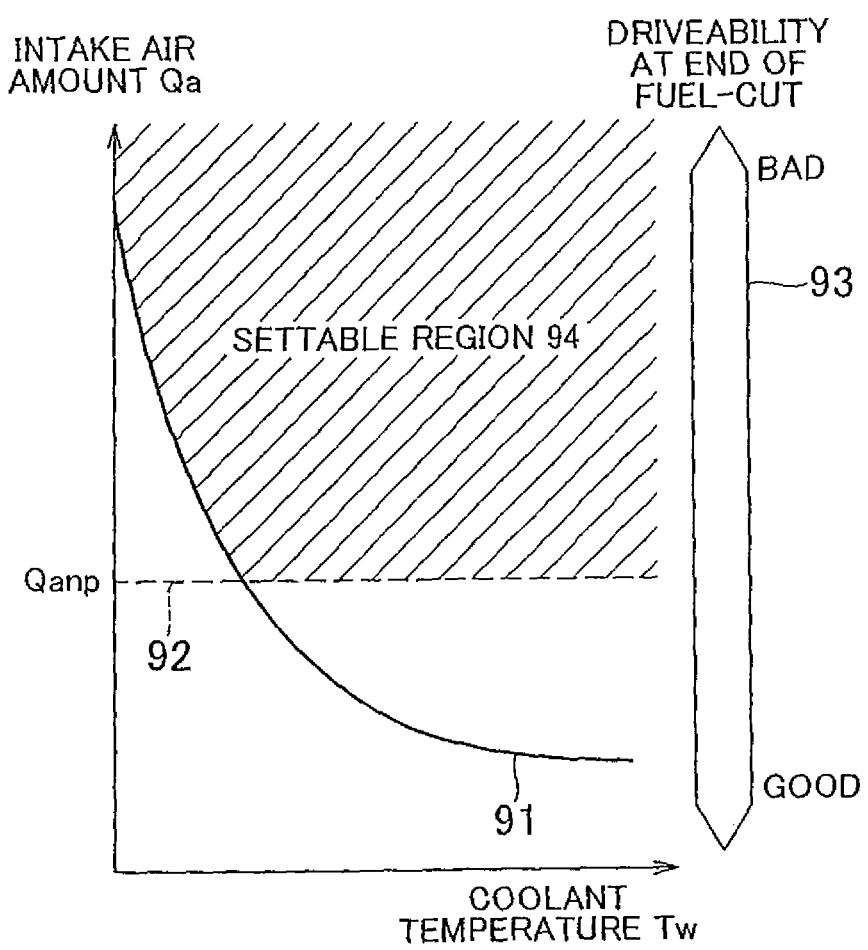
FIG. 3 is a diagram showing an intake air amount lower-limit-value map in accordance with an embodiment of the invention.

The intake air amount lower-limit-value map in accordance with this embodiment is expressed by a graph in which the coolant temperature Tw and the intake air amount Qa are associated in correspondence as shown in FIG. 3.

During the warming-up of the engine 2, that is, during a state in which the coolant temperature Tw is low, the lubricating oil that lubricates the piston 23 and the like in the cylinder block 13 has low temperature. Therefore, the viscosity of the oil is higher during the warming-up than after the warming-up ends, so that the friction force that occurs when the piston 23 slides increases. During the warming-up of the engine, the atomization of fuel injected from the injector 37 into the intake port 16 deteriorates and, in the case of the fuel injection from the port ignition type injector, there occurs a port-wet phenomenon in which a portion of the fuel injected deposits on a wall surface of the intake port 16, so that combustion becomes unstable.

Therefore, the related-art engine control device is designed so that during the warming-up of the engine, the engine rotation speed Ne at which to end the fuel-cut control is set higher than after the end of the warming-up in order to give higher priority to the prevention of engine stall resulting from misfire than to improvement of fuel economy when the supply of fuel into the combustion chamber is re-started at the end of the fuel-cut control.

On the other hand, in the engine control device 80 in accordance with this embodiment, the engine rotation speed Ne at which to end the fuel-cut control is set lower than in the related art in order to improve fuel economy, and despite of this setting, the occurrence of engine stall due to misfire is prevented by performing the intake air amount control with reference to the intake air amount lower-limit-value map, even when the supply of fuel into the combustion chamber 24 is re-started at the end of the fuel-cut control.

That is, while the engine 2 is being warmed up, the engine control device 80 in accordance with this embodiment makes the intake air amount Qa larger during execution of the fuel-cut control than during normal operation, in order to prevent occurrence of engine stall due to misfire.

Due to this, generally, there occurs a response delay from when the degree of opening of the throttle valve 55 is adjusted to when the intake air amount supplied to the combustion chamber 24 changes. However, in this embodiment, as an optimal amount of intake air is taken in beforehand during the fuel-cut control, the intake air amount Qa is an optimum value even when the fuel-cut control ends and fuel is supplied into the combustion chamber 24 again. Therefore, occurrence of engine stall can be prevented.

The combustion in the combustion chamber 24 becomes more unstable the lower the temperature of the engine is, that is, the lower the coolant temperature Tw is. Therefore, in the intake air amount lower-limit-value map, the lower limit value of the intake air amount Qa determined so as to prevent occurrence of engine stall is set higher, the lower the coolant temperature Tw, as shown by a solid line 91 in FIG. 3.

Besides, if while the vehicle 1 is traveling, the accelerator operation amount Acc enters a closed state and, during deceleration, the throttle valve 55 is closed, great negative pressure occurs within the intake pipe 51 at the downstream side of the throttle valve 55 and within the intake port 16 (hereinafter, referred to as intake pipe interior). If great negative pressure occurs within the intake pipe interior, the effect thereof changes the in-cylinder pressure in the combustion chamber 24 into negative pressure, so that so-called oil lift occurs. The oil lift becomes a cause of the consumption of oil in the combustion chamber 24. Therefore, from the viewpoint of restraining the oil consumption, it is desirable to avoid occurrence of excessive negative pressure within the intake pipe 51 at the downstream side of the throttle valve 55 and within the intake port 16.

The degree of closeness of the relationship between this oil lift and the coolant temperature is lower than the degree of closeness of the relationship between the occurrence of engine stall and the coolant temperature. Therefore, in the intake air amount lower-limit-value map in accordance with this embodiment, a constant value Qanp of intake air amount for restraining the oil lift is set regardless of the coolant temperature Tw, as shown by an interrupted line 92.

Besides, as indicated by an arrow-shaped scale 93 in FIG. 3, the greater the intake air amount Qa during the fuel-cut control, the greater the torque step between before and after the fuel-cut control ends becomes, and the more deteriorated the driveability of the vehicle 1 becomes. Therefore, qualitatively, the intake air amount Qa is preferred to be as small as possible, as long as engine stall does not occur. In this embodiment, the lower limit value of the intake air amount Qa that is represented by the solid line 91 and the interrupted line 92 is set so that driveability will not deteriorate. Besides, the lower limit value of the intake air amount decreases as the coolant temperature Tw becomes higher and therefore the possibility of occurrence of engine stall decreases. Therefore, driveability can be further improved. That is, in a range where the intake air amount Qa is above the interrupted line 92, the solid line 91 is defined so as to achieve the prevention of occurrence of engine stall and improvement of driveability in good balance.

In the embodiment, the engine control device 80 determines whether or not the target intake air amount Qat calculated as described above is in a settable range 94 that is defined by the lower limit values that are represented by the solid line 91 and the interrupted line 92. If the target intake air amount Qat is not in the settable range 94, the engine control device 80 executes a guard process of replacing the calculated target intake air amount Qat with one of the lower limit values represented by the solid line 91 and the interrupted line 92 which corresponds to the coolant temperature Tw detected by the coolant temperature sensor 75.

That is, the engine control device 80 is constructed so as to set the lower limit value of the intake air amount higher when the detected coolant temperature is relatively low than when the detected coolant temperature is relatively high.

Besides, the interrupted line 92 in accordance with this embodiment constitutes another lower limit value of the intake air amount in accordance with the invention. That is, the engine control device 80 in accordance with this embodiment has a construction in which another lower limit value of the intake air amount for causing the absolute value of the negative pressure in the combustion chamber of the internal combustion engine to be less than or equal to a predetermined value when the supply of fuel is stopped is set, and the another lower limit is set as a new lower limit value of the intake air amount when the coolant temperature is in a range of coolant temperature in which the another lower limit value is higher than the lower limit value that is set according to the coolant temperature. Therefore, the engine control device 80 in accordance with this embodiment constitutes an example of a lower limit value-setting device in accordance with the invention.

Besides, the engine control device 80 adjusts the degree of opening of the throttle valve 55 by controlling the throttle actuator 56 so that the actual intake air amount Qa becomes equal to the target intake air amount Qat. Concretely, the engine control device 80 stores in the ROM a throttle opening degree map in which the target intake air amount Qat and the degree of throttle opening are associated with each other in correspondence. When a target intake air amount Qat has been set, the engine control device 80 acquires a degree of throttle opening with reference to the throttle opening degree map. Then, the engine control device 80 controls the throttle actuator so as to achieve the degree of throttle opening. Therefore, the engine control device 80 in accordance with this embodiment constitutes an example of a control apparatus in accordance with the invention.

Besides, in the case where the vehicle 1 is equipped with an intake air amount sensor, the engine control device 80 may execute a feedback control so that the intake air amount detected by the intake air amount sensor, that is, the actual intake air amount, becomes closer to the target intake air amount Qat.

Next, operations will be described with reference to FIG. 4. Incidentally, the process described below is realized by a program that is pre-stored in the ROM 83, and is executed by the CPU 81 at predetermined time intervals.

Figure 4:
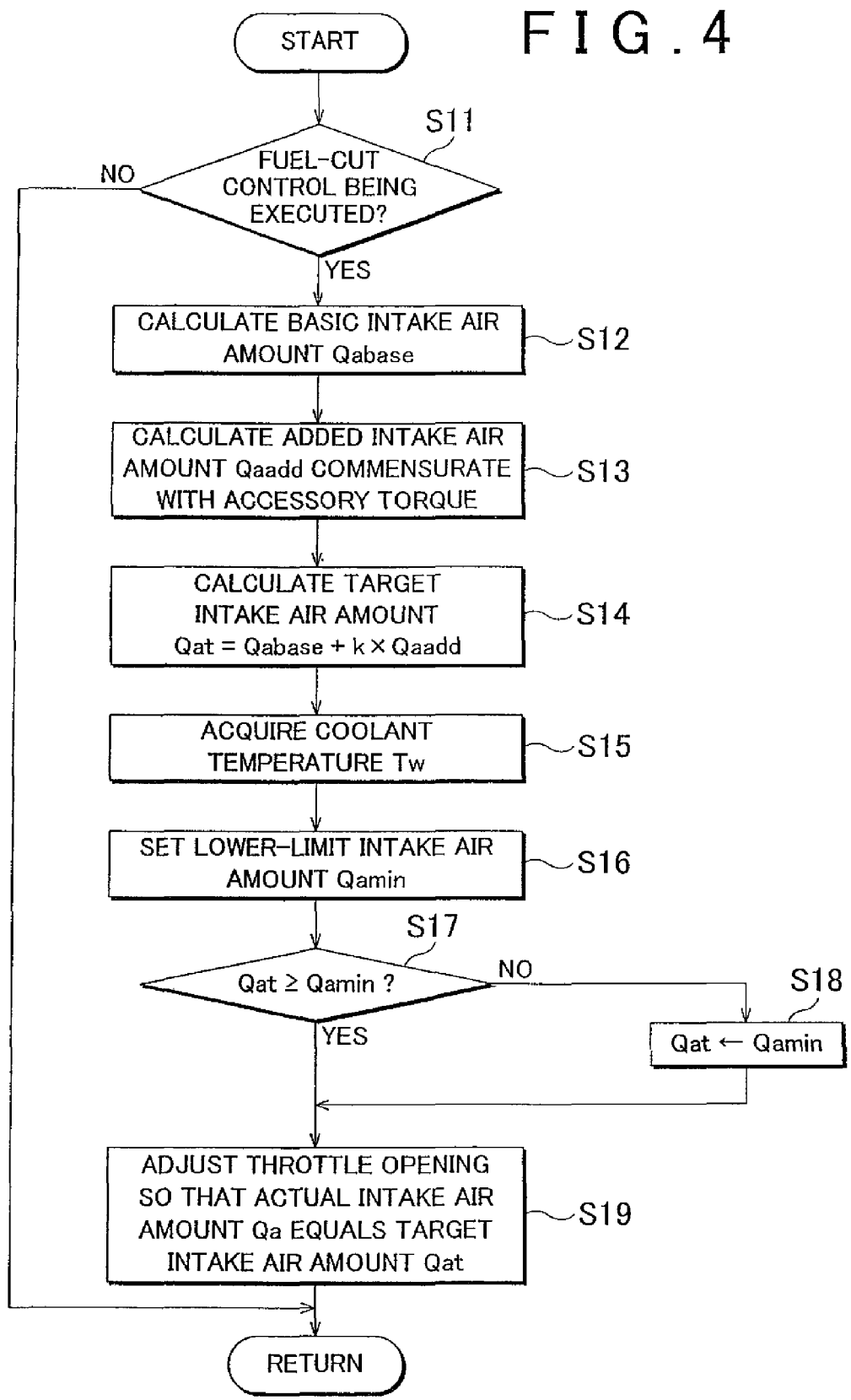
FIG. 4 is a flowchart showing an intake air amount control in accordance with an embodiment of the invention.

As shown in FIG. 4, firstly, the engine control device 80 determines whether or not the fuel-cut control is being executed (step S11). The engine control device 80 executes the fuel-cut control in the case where the fully closed state of the accelerator operation amount Acc is detected by the accelerator operation amount sensor 72 and where the engine rotation speed Ne is greater than or equal to a predetermined value. During execution of the fuel-cut control, the engine control device 80 sets up in the EEPROM 84 a flag that shows execution of the fuel-cut control, and determines whether or not the fuel-cut control is being executed on the basis of this flag.

If it is determined that the fuel-cut control is being executed (YES in step S11), the engine control device 80 proceeds to step S12. On the other hand, if it is determined that the fuel-cut is not being executed (NO in step S11), the engine control device 80 proceeds to a RETURN step.

If the answer to the determination in step S11 is YES, the process proceeds to step 12, in which the engine control device 80 calculates a basic intake air amount Qabase. Concretely, the engine control device 80 acquires from the engine rotation, speed sensor 76 a signal that represents the engine rotation speed Ne, and calculates a basic intake air amount Qabase from the engine rotation speed Ne with reference to the basic intake air amount map stored in the ROM 83.

Next, the engine control device 80 calculates an added intake air amount Qaadd commensurate with the accessory torque (step S13). Concretely, the engine control device 80 acquires signals that represent the states of driving of the airconditioner compressor, the coolant pump and the alternator, and then calculates an accessory torque therefrom on the basis of the airconditioner torque map, the coolant pump torque map and the alternator torque map. Then, with reference to the added intake air amount map, the engine control device 80 calculates an added intake air amount Qaadd that corresponds to the accessory torque.

Next, the engine control device 80 calculates a target intake air amount Qat from the basic intake air amount Qabase calculated in step S12, and the added intake air amount Qaadd commensurate with the accessory torque which is calculated in step S13, by using the following expression (1):

$$Qat = Qabase + k \times Qaadd \qquad (1)$$

where k is a coefficient that is determined beforehand by empirical measurement.

Next, the engine control device 80 acquires the coolant temperature Tw (step S15). Concretely, the engine control device 80 acquires the coolant temperature Tw on the basis of the signal input from the coolant temperature sensor 75.

Next, the engine control device 80 sets a lower-limit intake air amount Qamin (step S16). Concretely, with reference to the intake air amount lower-limit-value map stored in the ROM 83, the engine control device 80 sets a lower limit value of the intake air amount which corresponds to the coolant temperature TW acquired in step S15, as a lower-limit intake air amount Qamin.

Next, the engine control device 80 determines whether or not the target intake air amount Qat is greater than or equal to the lower-limit intake air amount Qamin (step S17). If it is determined that the target intake air amount Qat is greater than or equal to the lower-limit intake air amount Qamin (YES in step S17), the engine control device 80 proceeds to step S19. On the other hand, if it is determined that the target intake air amount Qat is less than the lower-limit intake air amount Qamin (NO in step S17), the engine control device 80 proceeds to step S18.

In step S18, the engine control device 80 executes the guard process with respect to the target intake air amount Qat.

$$Qat \leftarrow Qamin \qquad (2)$$

Next, in order to cause the actual intake air amount Qa to become equal to the target intake air amount Qat, the engine control device 80 sets a degree of throttle opening with reference to the foregoing throttle opening degree map, and controls the throttle actuator 56 so as to achieve the set degree of throttle opening (step S19).

As described above, in the vehicle 1 that stops supplying fuel to the engine when the vehicle 1 is decelerating, the engine control device 80 in accordance with the embodiment is able to increase the intake air amount Qa supplied into the combustion chamber 24 when the supply of fuel is stopped during the warming-up of the engine. Because of this, the engine control device 80 is able to certainly achieve combustion of fuel when the supply of fuel is started again during the warming-up of the engine, during which there is high possibility of misfire being caused by relatively low atomization of fuel or relatively high viscosity of lubricating oil. Therefore, although the engine rotation speed at which to end the fuel-cut control during the warming-up of the engine is set lower than in the related art, the engine rotation speed can be certainly made high at the end of the fuel-cut control. Hence, it is possible to re-start the supply of fuel later than in the related art without causing engine stall. As a result, fuel economy can be improved. Besides, after the warming-up of the engine ends, the lower limit value of the intake air amount is set lower than during the warming-up, so that the torque step that occurs at the time of re-start of the supply of fuel can be reduced and deterioration of driveability can be prevented.

Besides, the engine control device 80 is able to not only prevent engine stall during the warming-up of the engine but also prevent the oil that lubricates the pistons 23 and the like from entering the combustion chambers and being consumed therein due to the negative pressure of the internal combustion engine.

The foregoing description has been made in conjunction with the case where the engine control device 80 causes the actual intake air amount Qa to approach the target intake air amount Qat during execution of the intake air amount control, by controlling the degree of opening of the throttle valve 55.

However, it is also possible to adopt a construction in which the intake section 5 of the vehicle 1 is equipped with an ISC (Idle Speed Control) bypass passageway for adjusting the amount of flow of air supplied to the engine 2 when the operation state of the engine 2 is an idling state, and in which the engine control device 80 performs both adjustment of the degree of opening of the throttle valve 55 and adjustment of the amount of flow of air through the ISC bypass passageway. In this case, the ISC bypass passageway is provided with an ISC valve for adjusting the amount of air flow, and the ISC valve is driven so as to change the amount of air flow in the ISC bypass passageway by an ISC valve actuator that is controlled by the engine control device 80. In this case, for example, the degree of opening of the ISC valve is adjusted when the coolant temperature Tw is high, and the degree of opening of the throttle valve 55 is adjusted when the coolant temperature Tw is low so that the target intake air amount Qat cannot be achieved solely by the amount of air flow through the ISC bypass passageway.

Incidentally, since the ISC bypass passageway is generally provided for controlling the engine rotation speed Ne during the idling of the engine, the ISC bypass passageway is not sufficient to convey the amount of intake air that is needed in order to maintain combustion immediately after the end of the fuel-cut control during a state in which the engine is being warmed up and the engine rotation speed is low as mentioned above in conjunction with the embodiment. However, if the ISC bypass passageway is able to convey the amount of intake air needed in order to maintain the combustion immediately following the end of the fuel-cut control during the warming-up of the engine at low engine rotation speed, the engine control device 80 may adjust the degree of opening of the ISC valve instead of adjusting the degree of opening of the throttle valve 55.

Besides, the foregoing description has been made in conjunction with the case where the solid line 91 in the intake air amount lower-limit-value map in FIG. 3 is defined so that the lower limit value of the intake air amount continuously increases with decrease of the coolant temperature Tw. However, the solid line 91 may also be defined so as to provide the setting of two lower-limit values in which the smaller one of the lower-limit values is selected when the coolant temperature Tw is higher than or equal to a predetermined value, and the larger lower-limit value is selected when the coolant temperature Tw is lower than the predetermined value. In this case, the predetermined value is determined beforehand by empirical measurement, on the basis of the state of atomization of fuel and the viscosity of lubricating oil relative to the coolant temperature Tw. Besides, the solid line 91 may also be determined so as to define not only two lower limit values but also three or more lower limit values that are selected in the ascending order with decrease of the coolant temperature Tw.

Besides, although the foregoing description has been made in conjunction with the construction in which the vehicle 1 is equipped with the automatic transmission, the invention is not limited to this construction, but the vehicle 1 may have a manual transmission or a continuously variable transmission. Besides, the vehicle 1 may also be a hybrid vehicle that is driven by an engine and an electric motor. In this case, the condition for starting the fuel-cut control changes, in comparison with the case where the vehicle 1 is equipped with an automatic transmission. However, it is still possible to prevent occurrence of engine stall and improve fuel economy although the engine rotation speed at which to end the fuel-cut control is lower in the engine control device of this embodiment than in the related-art engine control device.

Besides, although according to the foregoing description, the intake air amount lower-limit-value map is defined by the solid line 91 and the interrupted line 92, the invention is not limited to this construction. For example, the intake air amount lower-limit-value map may be defined by only the solid line 91. In this case, although there is possibility of increase in the oil consumption due to the oil lift in comparison with the case where the intake air amount lower-limit-value map is defined by the solid line 91 and the interrupted line 92, it is possible to improve fuel economy as in the foregoing embodiment.

As described above, the control apparatus for a vehicle of the invention achieves effects of being able to improve fuel economy without causing engine stall in conjunction with execution of the fuel-cut during the warming-up of the engine, and of being able to prevent deterioration of driveability at the end of the fuel-cut control, and is useful to a control apparatus for a vehicle that is able to stop the supply of fuel to an internal combustion engine during deceleration.

The invention claimed is:

1. A vehicle control apparatus which is installed in a vehicle that includes an intake gas flow adjustment mechanism that is disposed on an intake passageway of an internal combustion engine and that adjusts an intake air amount that is taken into the internal combustion engine, and which adjusts the intake air amount by controlling the intake gas flow adjustment mechanism, comprising:
   a coolant temperature detector that detects coolant temperature of the internal combustion engine;
   a fuel supply stop device that stops supply of fuel to the internal combustion engine on a condition that the engine rotation speed of the internal combustion engine is greater than or equal to a predetermined value during deceleration of the vehicle;
   an intake air amount-setting device that sets the intake air amount based on a running condition of the vehicle;
   a control device that controls the intake gas flow adjustment mechanism so as to realize the intake air amount that is set by the intake air amount-setting device; and
   a lower limit value-setting device that sets a lower limit value of the intake air amount according to the coolant temperature detected by the coolant temperature detector, wherein
   the lower limit value-setting device sets the lower limit value of the intake air amount higher when the coolant temperature detected by the coolant temperature detector is relatively low than when the coolant temperature is relatively high, and the control device controls the intake gas flow adjustment mechanism so that the intake air amount taken into the internal combustion engine becomes equal to the lower limit value, when the intake air amount set by the intake air amount-setting device is less than the lower limit value set by the lower limit value-setting device while the supply of fuel has been stopped by the fuel supply stop device.

2. The vehicle control apparatus according to claim 1, wherein
   the lower limit value-setting device sets another lower limit value for causing absolute value of negative pressure in a combustion chamber of the internal combustion engine to be less than or equal to a predetermined value when the supply of fuel has been stopped by the fuel supply stop device, and sets the another lower limit value as a new lower limit value when the coolant temperature is in a range of the coolant temperature in which the another lower limit value is higher than the lower limit value that is set according to the coolant temperature.

3. The vehicle control apparatus according to claim 1, wherein
   the intake gas flow adjustment mechanism is constructed of a throttle valve, and the control device controls degree of opening of the throttle valve.

4. The vehicle control apparatus according to claim 1, wherein
   the intake gas flow adjustment mechanism has a throttle valve, and an idle speed control valve that is actuated during an idling state of the internal combustion engine, and the control device controls degree of opening of the throttle valve and degree of opening of the idle speed control valve.

5. The vehicle control apparatus according to claim 2, wherein the intake gas flow adjustment mechanism is constructed of a throttle valve, and the control device controls degree of opening of the throttle valve.

6. The vehicle control apparatus according to claim 2, wherein the intake gas flow adjustment mechanism has a throttle valve, and an idle speed control valve that is actuated during an idling state of the internal combustion engine, and the control device controls degree of opening of the throttle valve and degree of opening of the idle speed control valve.

7. A control method which is for a vehicle that includes an intake gas flow adjustment mechanism that is disposed on an intake passageway of an internal combustion engine and that adjusts an intake air amount that is taken into the internal combustion engine, and which adjusts the intake air amount by controlling the intake gas flow adjustment mechanism, comprising:

detecting coolant temperature of the internal combustion engine;

stopping supply of fuel to the internal combustion engine on a condition that engine rotation speed of the internal combustion engine is greater than or equal to a predetermined value during deceleration of the vehicle;

setting the intake air amount based on a running condition of the vehicle; and controlling the intake gas flow adjustment mechanism so as to realize the intake air amount set, wherein a lower limit value of the intake air amount is set according to the coolant temperature detected, and the lower limit value of the intake air amount is set higher when the coolant temperature is relatively low than when the coolant temperature is relatively high, and the intake gas flow adjustment mechanism is controlled so that the intake air amount taken into the internal combustion engine becomes equal to the lower limit value, when the intake air amount is less than the set lower limit value while the supply of fuel has been stopped.

8. The control method according to claim 7, wherein another lower limit value for causing absolute value of negative pressure in a combustion chamber of the internal combustion engine to be less than or equal to a predetermined value when the supply of fuel has been stopped is set, and the another lower limit value is set as a new lower limit value when the coolant temperature is in a range of the coolant temperature in which the another lower limit value is higher than the lower limit value that is set according to the coolant temperature.

* * * * *